US010817022B2

(12) United States Patent
Cho et al.

(10) Patent No.: US 10,817,022 B2
(45) Date of Patent: Oct. 27, 2020

(54) ELECTRONIC DEVICE AND CONTROL METHOD THEREFOR

(71) Applicant: SAMSUNG ELECTRONICS CO., LTD., Suwon-si (KR)

(72) Inventors: Kyu-hyun Cho, Suwon-si (KR); Hee-seok Jeong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/775,194

(22) PCT Filed: Nov. 16, 2016

(86) PCT No.: PCT/KR2016/013195
§ 371 (c)(1),
(2) Date: May 10, 2018

(87) PCT Pub. No.: WO2017/086689
PCT Pub. Date: May 26, 2017

(65) Prior Publication Data
US 2018/0374452 A1 Dec. 27, 2018

Related U.S. Application Data

(60) Provisional application No. 62/256,889, filed on Nov. 18, 2015.

(30) Foreign Application Priority Data

Feb. 3, 2016 (KR) .................. 10-2016-0013523

(51) Int. Cl.
G06F 1/16 (2006.01)
G06F 3/0488 (2013.01)
(Continued)

(52) U.S. Cl.
CPC .......... *G06F 1/1652* (2013.01); *G06F 1/1624* (2013.01); *G06F 3/0487* (2013.01);
(Continued)

(58) Field of Classification Search
CPC ................. G06F 1/1652; G06F 1/1624; G06F 2203/04803; G09F 3/04886; G09F 3/0487; G09F 3/04883; G06T 11/60
See application file for complete search history.

(56) References Cited

U.S. PATENT DOCUMENTS 9,019,313 B2 4/2015 Kwack et al.
9,098,241 B1 8/2015 Cho et al.
(Continued)

FOREIGN PATENT DOCUMENTS

CN 103946780 A 7/2014
CN 104424318 A 3/2015
(Continued)

OTHER PUBLICATIONS

Communication dated Nov. 6, 2018 by the United States Patent and Trademark Office in counterpart U.S. Appl. No. 15/276,991.
(Continued)

Primary Examiner — Liliana Cerullo
(74) Attorney, Agent, or Firm — Sughrue Mion, PLLC

(57) ABSTRACT

An electronic device and a control method therefor are provided. The electronic device comprises: a housing including a roll; a touch display which is wound on a roll, is capable of changing the size of a display area according to the rotation of the roll, and detects a touch of a user; a sensing part for sensing the size of the display area; and a processor which is electrically connected to the display and the sensing part, wherein if the size of the display area increases by the rotation of the roll while a user touch is detected in one area of the touch display while an execution
(Continued)

screen of an application is being provided in the display area, the processor may control the touch display so as to provide new information to the display area.

12 Claims, 14 Drawing Sheets

(51) Int. Cl.
*G06F 3/147* (2006.01)
*G06F 3/0487* (2013.01)
*G06T 11/60* (2006.01)

(52) U.S. Cl.
CPC ...... *G06F 3/04883* (2013.01); *G06F 3/04886* (2013.01); *G06F 3/147* (2013.01); *G06T 11/60* (2013.01); *G06F 2203/04803* (2013.01); *G06F 2203/04806* (2013.01); *G09G 2340/04* (2013.01); *G09G 2380/02* (2013.01)

(56) References Cited

U.S. PATENT DOCUMENTS

| | | | |
|---|---|---|---|
| 9,116,567 B2 | 8/2015 | Alberth, Jr. et al. | |
| 2007/0058045 A1 | 3/2007 | Misawa | |
| 2008/0037051 A1 | 2/2008 | Otsubo | |
| 2008/0186397 A1 | 8/2008 | Kim | |
| 2009/0051830 A1 | 2/2009 | Matsushita et al. | |
| 2009/0184935 A1* | 7/2009 | Kim | G06F 3/0416 345/173 |
| 2010/0056223 A1 | 3/2010 | Choi et al. | |
| 2010/0167791 A1 | 7/2010 | Lim | |
| 2011/0196812 A1 | 8/2011 | Jezek, Jr. | |
| 2012/0280924 A1 | 11/2012 | Kummer et al. | |
| 2013/0058063 A1 | 3/2013 | O'Brien | |
| 2013/0127918 A1 | 5/2013 | Kang et al. | |
| 2013/0201208 A1 | 8/2013 | Cho et al. | |
| 2013/0321340 A1* | 12/2013 | Seo | G06F 1/1641 345/174 |
| 2013/0328912 A1 | 12/2013 | Najarian et al. | |
| 2014/0043268 A1* | 2/2014 | Bae | G06F 3/0416 345/173 |
| 2014/0098028 A1 | 4/2014 | Kwak et al. | |
| 2014/0118317 A1 | 5/2014 | Song et al. | |
| 2014/0187227 A1 | 7/2014 | Song | |
| 2014/0198057 A1* | 7/2014 | Xia | G06F 3/04883 345/173 |
| 2014/0340299 A1 | 11/2014 | Lee et al. | |
| 2015/0029229 A1 | 1/2015 | Voutsas | |
| 2015/0074519 A1 | 3/2015 | He | |
| 2015/0220119 A1* | 8/2015 | Seo | G06F 3/041 345/173 |
| 2016/0349971 A1* | 12/2016 | Chi | G09G 5/373 |
| 2017/0010689 A1* | 1/2017 | Bostick | G06T 3/40 |
| 2017/0011714 A1* | 1/2017 | Eim | G09G 5/373 |
| 2018/0284964 A1* | 10/2018 | Kang | G06F 3/0488 |

FOREIGN PATENT DOCUMENTS

| | | |
|---|---|---|
| EP | 2 881 840 A2 | 6/2015 |
| JP | 2007-72406 A | 3/2007 |
| KR | 10-2006-0009089 A | 1/2006 |
| KR | 10-2010-0009008 A | 1/2010 |
| KR | 10-2013-0054072 A | 5/2013 |
| KR | 10-2014-0000749 A | 1/2014 |
| KR | 10-2014-0044237 A | 4/2014 |
| KR | 10-2015-0012233 A | 2/2015 |
| KR | 10-1540864 B1 | 7/2015 |
| WO | 2008/150600 A1 | 12/2008 |
| WO | 2013/077537 A1 | 5/2013 |
| WO | 2014/137019 A1 | 9/2014 |
| WO | 2014/200151 A1 | 12/2014 |

OTHER PUBLICATIONS

Communication dated Feb. 4, 2019 issued by the European Patent Office in counterpart European Application No. 16 866 604.8.
Communication dated Apr. 24, 2019 issued by the United States Patent and Trademark Office in counterpart U.S. Appl. No. 15/276,991.
Communication dated Feb. 23, 2017 by the International Searching Authority in counterpart International Patent Application No. PCT/KR2016/013195. (PCT/ISA/210).
Communication dated Feb. 23, 2017 by the International Searching Authority in counterpart International Patent Application No. PCT/KR2016/013195. (PCT/ISA/237).
Search Report dated Feb. 8, 2017, issued by the International Searching Authority in International Application No. PCT/KR2016/012854 (PCT/ISA/210).
Written Opinion dated Feb. 8, 2017, issued by the International Searching Authority in International Application No. PCT/KR2016/012854 (PCT/ISA/237).
Office Action dated Jan. 12, 2018, issued by the United States Patent and Trademark Office in counterpart U.S. Appl. No. 15/276,991.
Office Action dated Jul. 25, 2018, issued by the United States Patent and Trademark Office in counterpart U.S. Appl. No. 15/276,991.
Communication dated Jul. 16, 2018, issued by the European Patent Office in counterpart European Application No. 16866604.8.
Office Action dated Jul. 31, 2019, issued by the USPTO in U.S. Appl. No. 15/276,991.
Office Action dated Nov. 7, 2019, issued by the USPTO in U.S. Appl. No. 15/276,991.
Communication dated Feb. 14, 2020 from the United States Patent and Trademark Office in U.S. Appl. No. 15/276,991.
Communication dated Jul. 31, 2020 issued by the State Intellectual Property Office of P.R. China in counterpart Chinese Application No. 201680067215.2.
Communication dated Jul. 14, 2020 issued by the Korean Intellectual Property Office in counterpart Korean Application No. 10-2016-0013523.
Communication dated Jun. 2, 2020 issued by the United States Patent Office in counterpart U.S. Appl. No. 15/276,991.
Communication dated Aug. 31, 2020 issued by the United States Patent Office in counterpart U.S. Appl. No. 15/276,991.

* cited by examiner (a)

(b)

(a)

(b)

(a)

(b)

(a)

(b)

(a)

(b)

(a)

(b)

ELECTRONIC DEVICE AND CONTROL METHOD THEREFOR

TECHNICAL FIELD

The present disclosure relates to an electronic device and a control method therefor, and more particularly, to an electronic device including a display that is rolled by a roll and includes a display area having a size that changes according to a rotation of the roll, and a control method therefor.

BACKGROUND ART

Display apparatuses are among the most important electronic products. In recent years, the size of electronic devices, including display apparatuses, has been reduced. However, many consumers demand large screens. Therefore, flexible displays that may be rolled into electronic devices or that have foldable screens have been actively researched and developed.

In particular, rollable displays that may be rolled into rolls have been actively researched, and electronic devices including rollable displays are expected to be commercialized soon.

DISCLOSURE

Technical Problem

An object of the present disclosure is to provide an electronic device capable of providing new information to a display in which a displaying area is changed when touch and rolling interaction or touch and unrolling interaction is input, and a control method therefor.

Technical Solution

According to an aspect of the present disclosure, an electronic device includes a housing containing a roll; a touch display configured to be rolled on the roll, and sense a touch of a user, the touch display comprising a display area having a size that changes according to a rotation of the roll; a sensor configured to sense the size of the display area; and a processor electrically connected to the display and the sensor, wherein the processor is configured to control the touch display to provide new information to the display area, when the size of the display area is increased according to the rotation of the roll in a state in which the touch of the user is sensed in one area of the touch display while an execution screen of an application is provided to the display area.

According to another aspect of the present disclosure, a control method for an electronic device including a housing containing a roll and a touch display configured to be rolled on the roll, the touch display comprising a display area having a size that changes according to a rotation of the roll, and the touch display displaying a screen including at least one element on the display area, includes providing an execution screen of an application to the display area; sensing an increase in a size of the display area according to the rotation of the roll in a state in which a touch of a user is sensed in one area of the touch display; and providing new information together with the execution screen of the application to the display area.

Advantageous Effects

According to the diverse exemplary embodiments of the present disclosure, when the display area is expanded through various interactions, the new information is provided to the display, thereby making it possible to improve usability of the user.

BEST MODE

Figure 1:
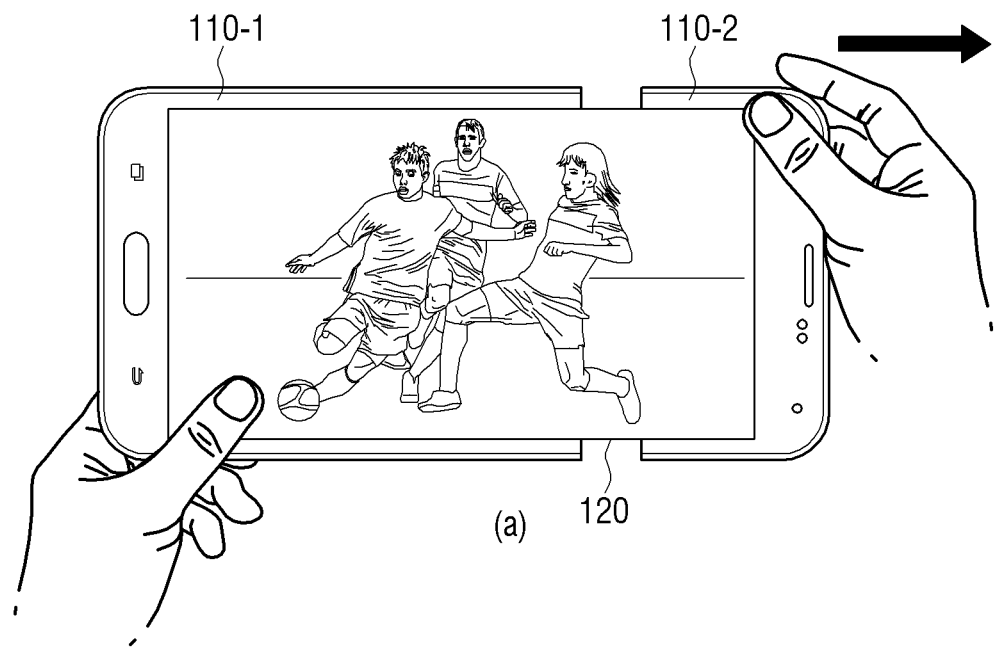
FIG. 1 is a diagram illustrating an example providing new information according to an occurrence of a change in a size of a displaying area of an electronic device after a touch of a user is sensed on the displaying area, according to an exemplary embodiment of the present disclosure.
Figure 1:
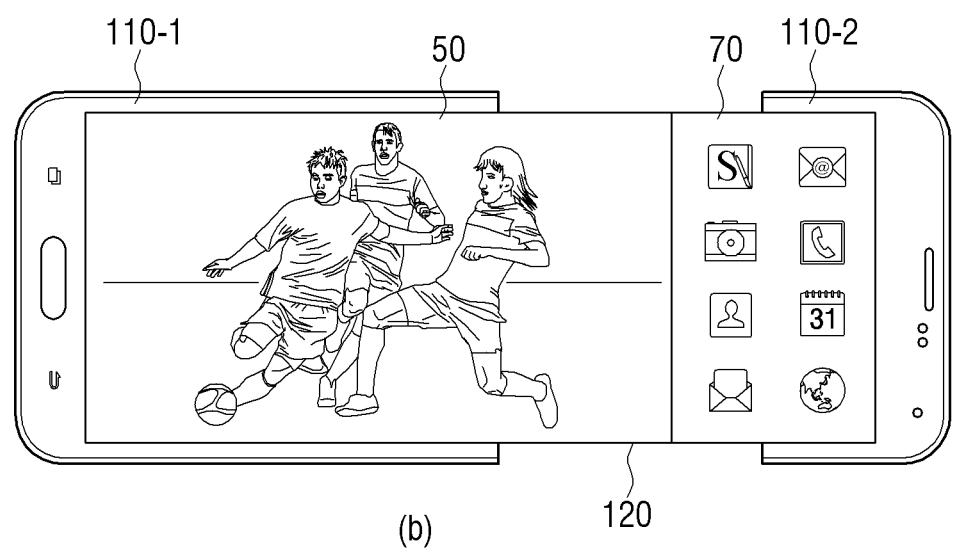

Hereinafter, the present disclosure will be described with reference to the accompanying drawings. Specific exemplary embodiments of the present disclosure are illustrated in the drawings and a detailed description in connection with the present disclosure is described, but the present disclosure may be variously modified and may have several exemplary embodiments. Therefore, it is to be understood that the present disclosure is not limited to the specific exemplary embodiments, but includes all modifications, equivalents, and substitutions included in the spirit and the scope of the present disclosure. In related to a description of the drawings, similar components will be denoted by similar reference numerals.

Expressions "include", "may include", and the like which may be used in the present disclosure indicate existence of a disclosed corresponding function, operation, component, and the like, and do not limit additional one or more functions, operations, components, and the like. In addition, it is to be understood that the terms "include" or "have" used in the present disclosure, specify the presence of stated features, numerals, steps, operations, components, parts, or a combination thereof, but do not preclude the presence or addition of one or more other features, numerals, steps, operations, components, parts, or a combination thereof.

In addition, the expression "and/or" and the like in the present disclosure include any and/or all combination of words listed together. For example, A and/or B may include A, include B, or include both A and B.

In addition, expressions "first", "second", and the like in the present disclosure may indicate various components of the present disclosure, but do not limit the corresponding components. For example, the expressions do not limit a sequence and/or importance of the corresponding components. The expressions may be used to distinguish one component from other components. For example, a first user device and a second user device are all user devices and indicate the user devices different from each other. For example, a first component may be named a second component and the second component may also be similarly named the first component without departing from the scope of the present disclosure.

It is to be understood that when one component is referred to as being "connected to" or "coupled to" another component, it may be connected directly to or coupled directly to another component but be connected to or coupled to another component while having the other component intervening therebetween. On the other hand, it is to be understood that when one component is referred to as being "connected directly to" or "coupled directly to" another component, it may be connected to or coupled to another component without having the other component intervening therebetween. The terminology used in the present disclosure is for the purpose of describing specific exemplary embodiments only and is not intended to limit the present disclosure. As used herein, the singular forms are intended to include plural forms as well, unless the context clearly indicates otherwise.

In addition, in the present disclosure, a user interaction may include at least one of a touch interaction, a rolling interaction, an unrolling interaction, a touch and rolling interaction, a touch and unrolling interaction, a bending interaction, a voice interaction, a button interaction, a motion interaction, and a multimodal interaction, but is not limited thereto.

In particular, the "rolling interaction" used herein may be an interaction of rolling a flexible display to decrease a display area of the flexible display, i.e., an interaction of inserting the flexible display into a housing of an electronic device by a rotation of a roll. Also, the "unrolling interaction" used herein may be an interaction of unrolling the flexible display to increase the display area of the flexible display, i.e., an interaction of taking the flexible display out of the housing of the electronic device by a rotation of the roll. In addition, the "touch and rolling interaction" or the "touch and unrolling interaction may be an interaction of inserting the flexible display into a housing of an electronic device or an interaction of taking the flexible display out of the housing of the electronic device by the rotation of the roll in a state in which the user touches the flexible display.

Also, the "application" used herein refers to a series of computer program sets designed to perform a particular job. Here, the application may be one or more of various types of applications. For example, the application may be a web application, a game application, a moving image play application, a map application, a memo application, a schedule application, a phonebook application, a broadcast application, an exercise support application, a payment application, a photo folder application, a medical device control application, an application providing user interfaces of a plurality of medical devices, or the like but is not limited thereto.

In addition, the "layout" used herein may refer to a method of displaying the number of elements configuring a screen, locations of the elements, and display items of the elements. In other words, a change in the layout of the screen may mean that the number of elements configuring the screen is changed, the locations of the elements are changed, or a display method of the display items of the elements is changed (e.g., a moving image content is changed into an icon). Here, the locations of the elements may be relative locations between the elements.

Hereinafter, diverse exemplary embodiments of the present disclosure will be described with reference to the accompanying drawings. FIG. 1 is a diagram illustrating an example providing an execution screen of an application according to a size of a displaying area of an electronic device 100 according to an exemplary embodiment of the present disclosure. Meanwhile, the electronic device 100 according to an exemplary embodiment of the present disclosure may be a portable terminal such as a smart phone, but is merely one example and may be implemented as various electronic devices such as a tablet PC, a notebook PC, a desktop PC, a digital TV, and the like.

The electronic device 100 may display a screen including at least one element. Here, the screen may be various screen such as an application execution screen, a menu screen, an unlock screen, and the like. In addition, at least one element may include various element such as a content, an icon, a text, a widget, a graphic item (e.g., a progress bar, or the like), and the like. For example, the electronic device 100 may display an execution screen of an application, as illustrated in FIG. 1A.

Meanwhile, the electronic device 100 according to an exemplary embodiment of the present disclosure includes a left housing 110-1, a right housing 110-2, and a rollable touch display 120, as illustrated in FIG. 1. In particular, the left housing 110-1 may include a roll 115 on which a display 120 may be rolled, and an opening 117 through which the display 120 may be inserted into and/or taken out of the electronic device 100, and the right housing 110-2 may be coupled integrally to the display 120, as illustrated in FIG. 2A.

In addition, the display 120 may be inserted into and/or taken out of the electronic device 100 through the opening 117 according a rotation of the roll. When the display 120 is inserted into the opening 117, the displaying area of the display 120 may be reduced, and when the display 120 is taken out of the opening 117, the displaying area of the display 120 may be increased. In this case, the rotation of the roll may be performed by a user interaction in which the user pulls or pushes the right housing 110-2, but this is merely one example. The rotation of the roll may be automatically performed by a driving part driving the roll.

Meanwhile, although the exemplary embodiment described above illustrates the case in which the rotation of the roll is performed by the interaction in which the user pulls or pushes only the right housing 110-2, this is merely one example. Rolls are formed in both the housings 110-1 and 110-2 so that the rotation of the roll may be performed by an interaction in which at least one of both the housings 110-1 and 110-2 is pulled or pushed.

Figure 2A:
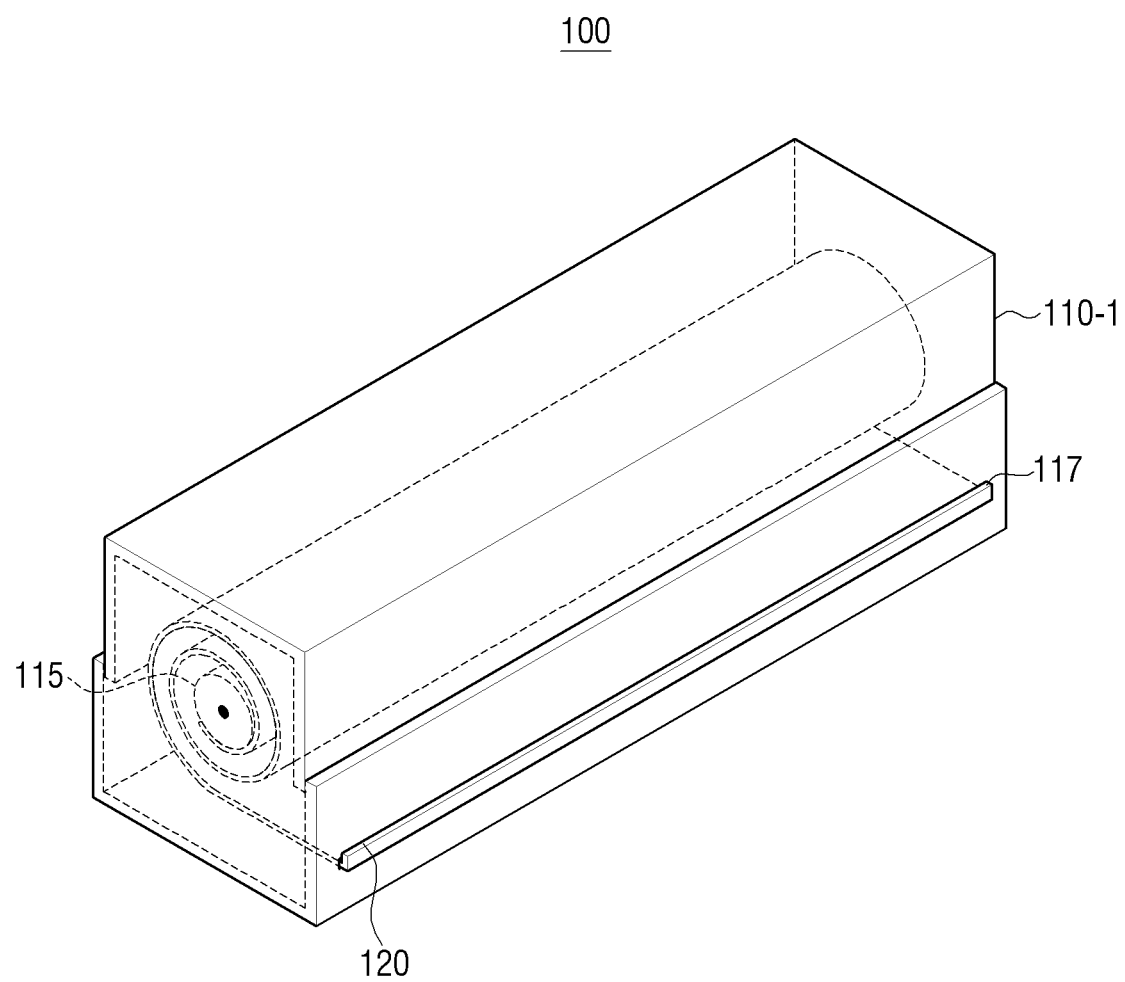
FIGS. 2A and 2B are diagrams illustrating an electronic device including a rollable display according to an exemplary embodiment of the present disclosure.

In addition, although the electronic device 100 is not illustrated in FIG. 2A, a configuration capable of fixing a state in which the display 120 is rolled and a state in which the display 120 is unrolled may be included.

In particular, when the unrolling interaction of the user is input, the electronic device 100 may take the display out of the housing of the electronic device 100 according to the rotation of the roll that is performed by the unrolling interaction. Alternatively, when the rolling interaction of the user is input, the electronic device 100 may insert the display into the housing of the electronic device 100 according to the rotation of the roll that is performed by the rolling interaction.

In particular, in a case in which the size of the displaying area is increased according to the rotation of the roll in a state in which a touch of the user is sensed on one area of a touch display while the execution screen of the application is provided to the displaying area, the electronic device 100 may provide new information to the displaying area. In this case, the new information may include a variety of information such as a user interface (UI) including at least one item for controlling the electronic device 100, an UI associated with the executed application, alarm information, history information, and the like.

Specifically, as illustrated in FIG. 1Aa, the electronic device 100 may display an execution screen 50 of an application (e.g., a video application). In addition, when the touch and unrolling interaction in which the size of the displaying area is increased according to the rotation of the roll is sensed in a state in which one area of the touch display 120 is touched, the electronic device 100 may display an UI 70 including an item for controlling the electronic device 100 together with the execution screen 50 of the existing application, as illustrated in FIG. 1B.

In this case, a position at which the UI 70 including the item for controlling the electronic device 100 is to be displayed may be determined according to the area in which the touch of the user is sensed. For example, in a state in which the user touches a right area of the touch display 120, when the displaying area is increased according to the rotation of the roll, the electronic device 100 may display the new information on a left area which is the opposite side of the area in which the touch of the user is sensed.

In addition, a size of the UI 70 including the item for controlling the electronic device 100 may be increased to correspond to an increased size of the displaying area. That is, the size of the UI 70 including the item for controlling the electronic device 100 may be increased according to the increased size of the displaying area, while the size of the displayed execution screen 50 of the existing application is maintained.

Meanwhile, when the size of the displaying area is increased according to the rotation of the roll without the touch of the user while the execution screen of the application is displayed on the touch display 120 of the electronic device 100, the electronic device 100 may increase the size of the execution screen of the existing application to be proportional to the increased size of the displaying area. In addition, if the increased size of the displaying area is a predetermined size or more, the electronic device 100 may change and display a layout of the execution screen of the existing application. Here, the change in the layout may mean a change in relative dispositions of elements, a change in the number of elements, or a change in a display form of the elements on the screen.

Figure 3A:
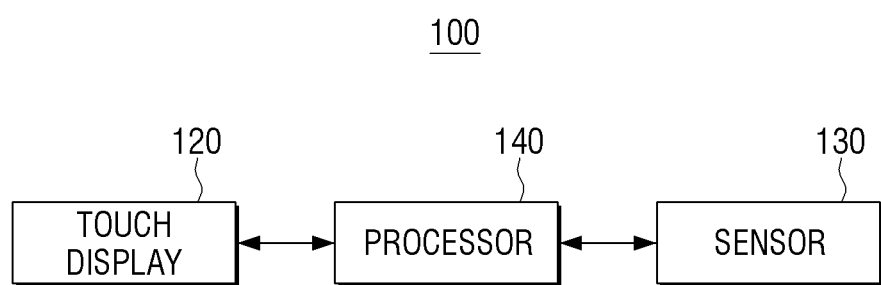
FIGS. 3A and 3B are block diagrams illustrating a hardware configuration of the electronic device according to an exemplary embodiment of the present disclosure.

FIG. 3A is a block diagram schematically illustrating a configuration of the electronic device 100 according to an exemplary embodiment of the present disclosure. As illustrated in FIG. 3A, the electronic device 100 includes a touch display 120, a sensor 130, and a processor 140.

The touch display 120 displays image data. In particular, the touch display 120 may be implemented as a flexible display. In addition, the touch display 120 may be inserted into the housing 110 of the electronic device 100 or taken out of the housing 110 thereof according to the rotation of the roll included in the housing 110 of the electronic device 100.

When the touch display 120 is inserted into or taken out of the housing according to the rotation of the roll, the displaying area of the touch display 120 may be changed according to the rotation of the roll. Specifically, when the touch display 120 is inserted into the housing according to the rotation of the roll, the displaying area of the touch display 120 may be reduced. In addition, when the touch display 120 is taken out of the housing according to the rotation of the roll, the displaying area of the touch display 120 may be increased.

In addition, the touch display 120 may display a screen including at least one element according to a control of the processor 140. For example, the touch display 120 may display an execution screen of an application (e.g., a web application, a camera application, a gallery application, a message application, and the like) including a plurality of contents and icons. In addition, the touch display 120 may display a standby screen including a plurality of widgets and a plurality of icons. In addition, the touch display 120 may display an unlock screen including a plurality of widgets and unlock icons.

In addition, the touch display 120 may sense the touch of the user for controlling the electronic device 100. In particular, the touch display 120 may include a display panel for outputting an image and a touch panel for sensing the touch of the user.

Figure 2B:
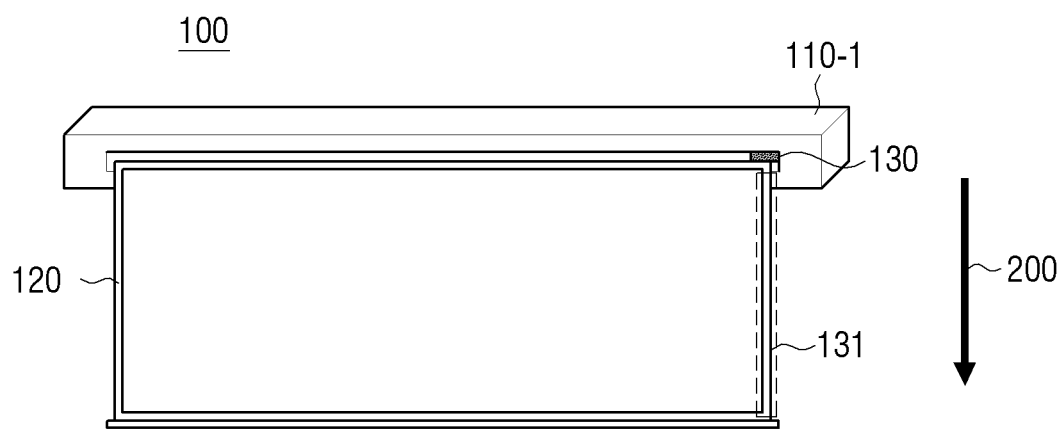

The sensor 130 may include various sensors and may transfer information collected by each of the sensors to the processor 140. In particular, the sensor 130 may include a sensor that senses an amount of the display 120 taken out of the housing according to the rotation of the roll. Specifically, referring to FIG. 2B, the left housing 110-1, the display 120, and the sensor 130 are illustrated. The display 120 may be rolled into the left housing 110-1 or taken out of the left housing 110-1. A taken direction of the display 120 may be a downward direction 200. The sensor 130 may be an optical sensor and may sense a pattern 131 printed on the display 120. The pattern 131 may be a Quick Response (QR) code, a barcode, a black and white pattern, or a color pattern corresponding to a pixel line of the display 120. As the display 120 is taken out of the left housing 110-1, a value of the pattern 131 printed on the display 120 may be changed, and the processor 140 may sense an amount of the display 120 taken out according to the changed value of the pattern 131.

Meanwhile, the exemplary embodiment described above is merely one example and the amount of the display 120 taken out may be determined by various methods. For example, the amount of the display 120 taken out may be determined by a motion sensing sensor such as a gyro sensor, and may be determined by a rotation sensing sensor that senses the rotation of the roll.

The processor 140 is electrically connected to the display 120 and the sensor 130, and controls an overall operation of the electronic device 100. Specifically, in a case in which the size of the displaying area is increased according to the rotation of the roll in a state in which a touch of the user is sensed on one area of the touch display 120 while the execution screen of the application is provided to the displaying area, the processor 140 may control the touch display 120 to provide new information to the displaying area. In particular, the processor 140 may control the touch display 120 to provide the new information to the displaying area while maintaining the size of the execution screen of the application. That is, the processor 140 may control the touch display 120 to increase a size of an area to which the new information is provided according to the increased size of the displaying area while maintaining the size of the execution screen of the application.

In addition, the processor 140 may control the touch display 120 to provide the new information to a position opposite to the area in which the touch of the user is sensed. For example, in a case in which the size of the displaying area is increased according to the rotation of the roll 115 in a state in which the touch of the user touches a right area of the touch display 120, the processor 140 may control the touch display 120 to provide the new information to a left area of the displaying area. In addition, in a case in which the size of the displaying area is increased according to the rotation of the roll 115 in a state in which the touch of the user touches the left area of the touch display 120, the processor 140 may control the touch display 120 to provide the new information to the right area of the displaying area.

On the other hand, in a case in which the size of the displaying area is increased according to the rotation of the roll 115 in a state in which the touch of the user is not sensed in one area of the touch display 120 while the execution screen of the application is provided to the displaying area, the processor 140 may control the touch display 120 to increase the size of the execution screen of the application provided to the display area according to the increase in the size of the displaying area without displaying the new information.

That is, when the size of the displaying area is increased according to the rotation of the roll 115, the processor 140 may provide screens of different layouts to the user depending on whether or not the touch of the user is sensed.

In addition, in a case in which the size of the displaying area is reduced according to the rotation of the roll in a state in which the touch of the user is sensed while the execution screen of the application and the new information are displayed on the displaying area, the processor 140 may control the touch display 120 to provide different screens according to a position of the area in which the touch of the user is sensed.

For example, in a case in which the size of the displaying area is reduced according to the rotation of the roll 115 in a state in which the touch of the user is sensed in the area to which the execution screen of the application is provided, the processor 140 may control the touch display 120 to provide only the execution screen of the application to the displaying area. In addition, in a case in which the size of the displaying area is reduced according to the rotation of the roll 115 in a state in which the touch of the user is sensed in the area to which the new information is provided, the processor 140 may control the touch display 120 to provide only the new information to the displaying area.

In addition, in a case in which the size of the displaying area is reduced according to the rotation of the roll in a state in which the touch of the user is not sensed in the touch display while the execution screen of the application and the new information are displayed on the displaying area, the processor 140 may control the touch display 120 to reduce sizes of the execution screen and the new information according to the reduction in the size of the displaying area.

In addition, in a case in which a drag interaction is sensed in the area on which the new information is displayed while the execution screen of the application and the new information are displayed on the displaying area, the processor 140 may control the touch display 120 to provide another information to the area on which the new information is displayed.

Figure 3B:
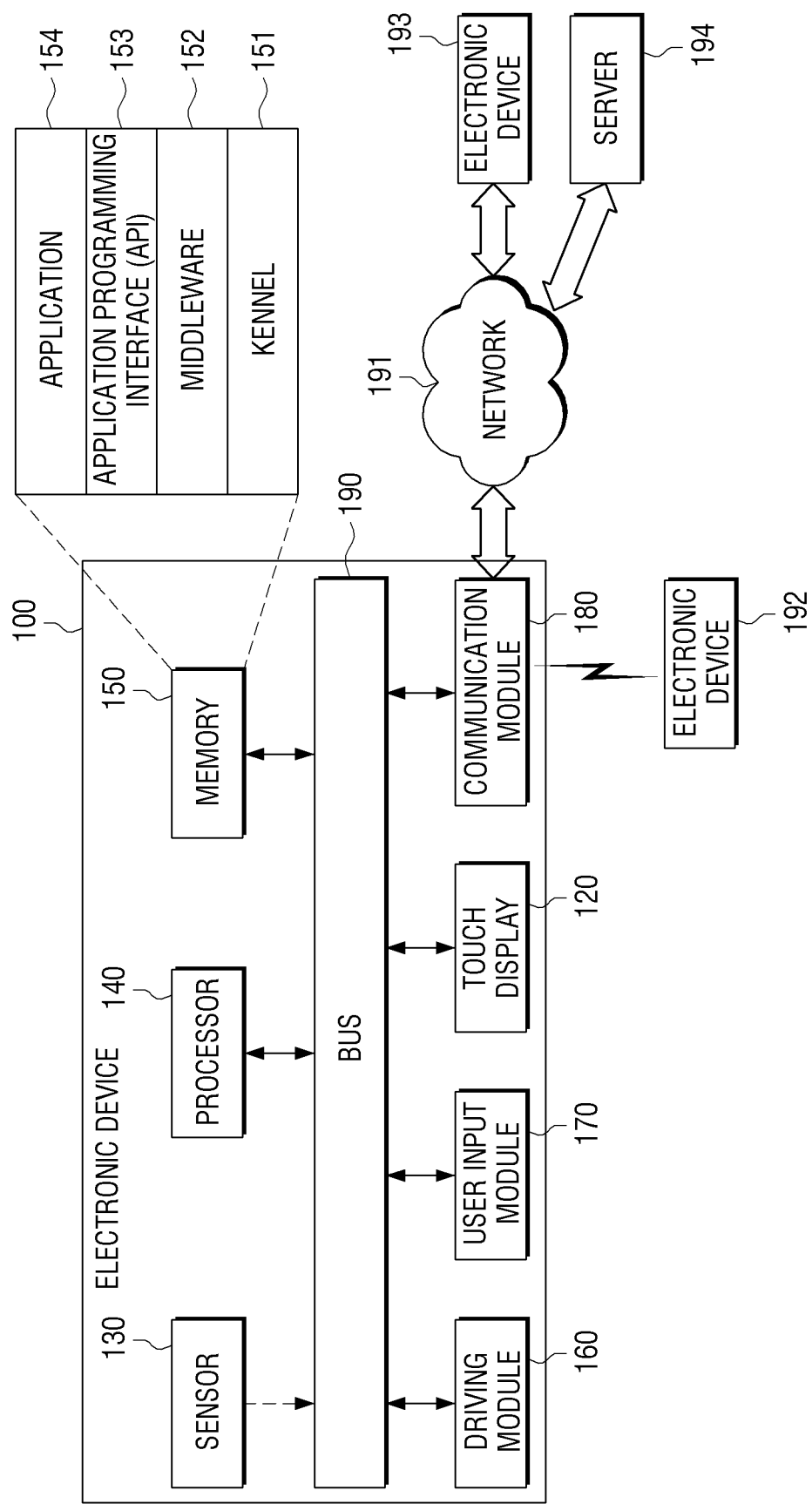

FIG. 3B is a block diagram illustrating the configuration of the electronic device according to an exemplary embodiment of the present disclosure in detail. As illustrated in FIG. 3B, the electronic device 100 includes the sensor 130, the processor 140, a memory 150, a driving module 160, a user input module 170, the touch display 120, a communication module 180, and a bus 190. Meanwhile, the configuration illustrated in FIG. 3B is merely one example, new components may be added and at least one component may be removed according to implementations.

The processor 140 may receive, for example, commands from other components (e.g., the memory 150, the driving module 160, the user input module 170, the touch display 120, the communication module 160, and the like) through the bus 190 to decrypt the received commands and execute an operation or data processing according to the decrypted commands.

In addition, the processor 140 controls an overall operation of the electronic device 100. In particular, the processor 140 may change one of the sizes and layout of the elements according to the change in the displaying area sensed by the sensor 130. Meanwhile, the processor 140 may be implemented as at least one of a graphic processing unit (GPU), a central processing unit (CPU), and an application processor (AP), and may also be implemented as a single chip.

The memory 150 may store commands or data received from the processor 140 or other components (e.g., the driving module 160, the user input module 170, the display 120, the communication module 160, and the like) or generated by the processor 140 or other components. The memory 150 may include, for example, programming modules such as a kennel 151, a middleware 152, an application programming interface (API) 153, an application 154, or the like. The respective programming modules described above may be configured in software, firmware, hardware, or a combination of two or more thereof.

Meanwhile, the memory 150 may be implemented as various memories. For example, the memory may be implemented as an internal memory (e.g., a volatile memory (DRAM, SRAM), a non-volatile memory (OTPROM, PROM), or the like) or an external memory (e.g., a flash drive, a CD, a SD, or the like).

The driving module 160 is a module capable of driving the rotation of the roll 115 for rolling or unrolling the display. In this case, the driving module 160 may automatically rotate the roll 115 according to a user command which is input through the user input module 170, and may semi-automatically rotate the roll 115 according to an external force (a pushing or pulling force) which is input to the housing. In addition, the driving module 160 may roll or unroll the display by a driving method other than the rotation of the roll.

In this case, the driving module 160 may be implemented as a motor and a circuit for controlling the motor, but this is merely one example, and the driving module 160 may be implemented as other configurations.

The user input module 170 may receive, for example, the command or data from the user, and transfer the command or data to the processor 140 or the memory 150 through the bus 190.

The user input module 170 may include various user input devices such as a (digital) pen sensor, a key or ultrasonic wave input device, a keyboard, a mouse, a voice input device, a pointing device, a remote control signal receiver, and the like.

The touch display 120 may display a picture, an image or data to the user. In particular, the touch display 120 may be implemented as a liquid-crystal display (LCD), an active-matrix organic light-emitting diode (AM-OLED), and the like, and may be implemented to be flexible, transparent, or wearable.

In addition, the touch display 120 may include a display panel and a touch panel.

The communication module 180 may connect communications between another electronic device 192 and the electronic device 100, and may perform communication between another electronic device 193 and a server 194 through a network 191. The communication module 180 may support a predetermined short range communication protocol (e.g., wireless fidelity (Wi-Fi), Bluetooth (BT), near field communication (NFC) or a predetermined network communication (e.g., Internet, a local area network (LAN), a wire area network (WAN), a telecommunication network, a cellular network, a satellite network or a plain old telephone service (POTS). Each of the electronic devices 192 and 193 may be the same (e.g., the same type of) or different (e.g., different type of) device as the electronic device 100.

In particular, the communication module 180 may perform a communication connection with an external server 194 through the network 191 to receive data for a web application.

The sensor 130 may include various sensors such as a gyro sensor, a gesture sensor, a grip sensor, an acceleration sensor, and the like, and may provide information collected by each of the sensors to the processor 140 in a predetermined unit of time.

In particular, the sensor 130 may include at least one of, for example, a gesture sensor, a gyro sensor, an atmospheric pressure sensor, a magnetic sensor, an acceleration sensor, a grip sensor, a proximity sensor, a RGB (red, green, blue) sensor, a biometric sensor, a temperature/humidity sensor, an illuminance sensor, or a ultra violet (UV) sensor. The sensor 130 may measure physical quantity or sense an operation state of the electronic device to convert the measure or sensed information into an electrical signal. The sensor 130 may further include a control circuit for controlling one or more sensors included therein. In addition, the sensor 130 may include various sensors for sensing the rotation of the roll.

The bus 190 may be a circuit that connects the components described above with each other and transfers a communication signal (e.g., a control message) between the components described above.

The term "part" or "module" used in the present disclosure may mean, for example, a unit including one of hardware, software or firmware, or a combination of two or more thereof. The term "part" or "module" may be interchangeably used with, for example, the term such as logic, a logical block, a component, or a circuit. The "part" or "module" may be a minimum unit of an integrally configured component, or a portion thereof. The "module" may be a minimum unit performing one or more functions, or a portion thereof. The "module" may be implemented mechanically or electronically. For example, the "module" according to the present disclosure may include at least one of an application-specific integrated circuit (ASIC) chip, field-programmable gate arrays (FPGAs) or a programmable-logic device that perform any operations which are known or are to be developed.

Figure 4A:
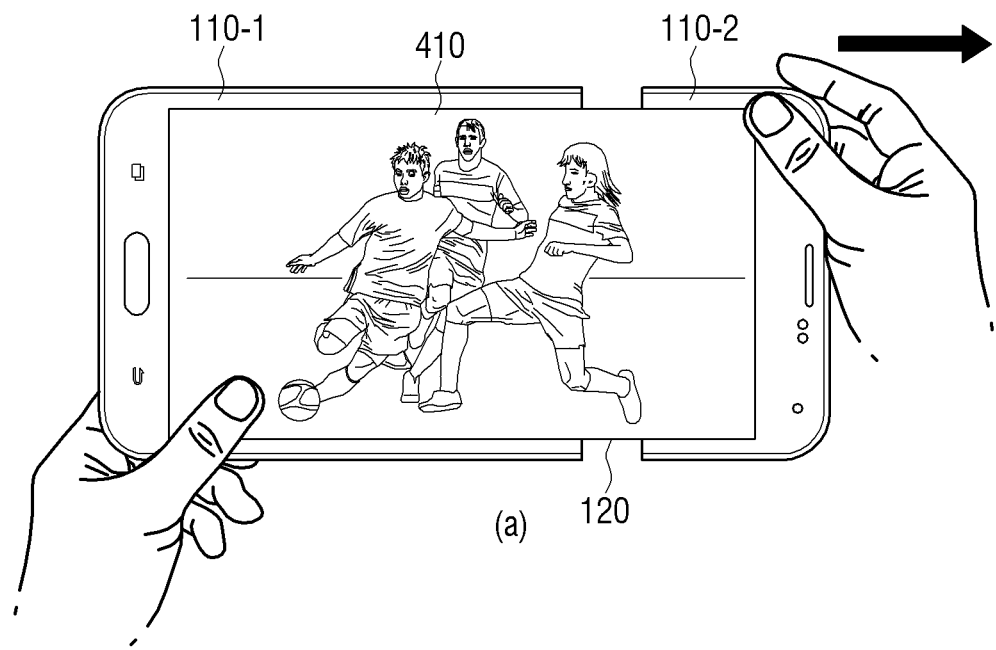
FIGS. 4A and 4B are diagrams illustrating various examples providing new information according to a position at which the touch of the user is sensed according to an exemplary embodiment of the present disclosure.
Figure 4A:
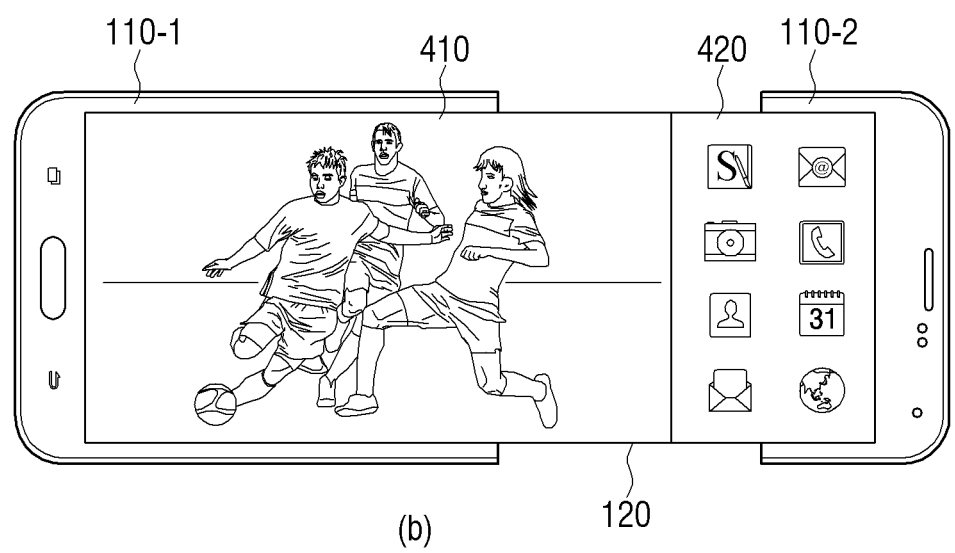

Hereinafter, the present disclosure will be described in more detail with reference with FIGS. 4A to 9. FIGS. 4A and 5 are diagrams illustrating examples providing new information depending on whether or not a touch of a user is sensed when a size of a displaying area is increased by an unrolling interaction.

First, as illustrated in FIG. 4Aa, the processor 140 controls the touch display 120 to display an execution screen of a video application.

In addition, the processor 140 may sense a touch and unrolling interaction in which a touch of a user touching a left area of the touch display 120 is sensed through the sensor 130 and the user expands the display area in a right direction.

If the touch and unrolling interaction is sensed, the processor 140 may control the touch display 120 to display a UI 420 including execution icons capable of executing another application on the right area of the touch display, as illustrated in FIG. 4Ab.

That is, if the display area is increased according to the rotation of the roll 115 in a state in which the user touches a left area of the touch display 120, the processor 140 may display new information on the right area of the touch display 120.

If the display area is increased according to the rotation of the roll 115 in a state in which the user touches the left area of the touch display 120, the processor 140 may control the touch display 120 so that the size of the execution screen 410 of the existing video application is maintained, but a size of the UI 420 including the execution icons is gradually increased as the display area is increased. In this case, the UI 420 including the execution icons may be gradually increased as the display area is increased, but this is merely one example, and when the size of the display area becomes larger than a predetermined size, the UI 420 including the execution icons may be displayed.

Figure 4B:
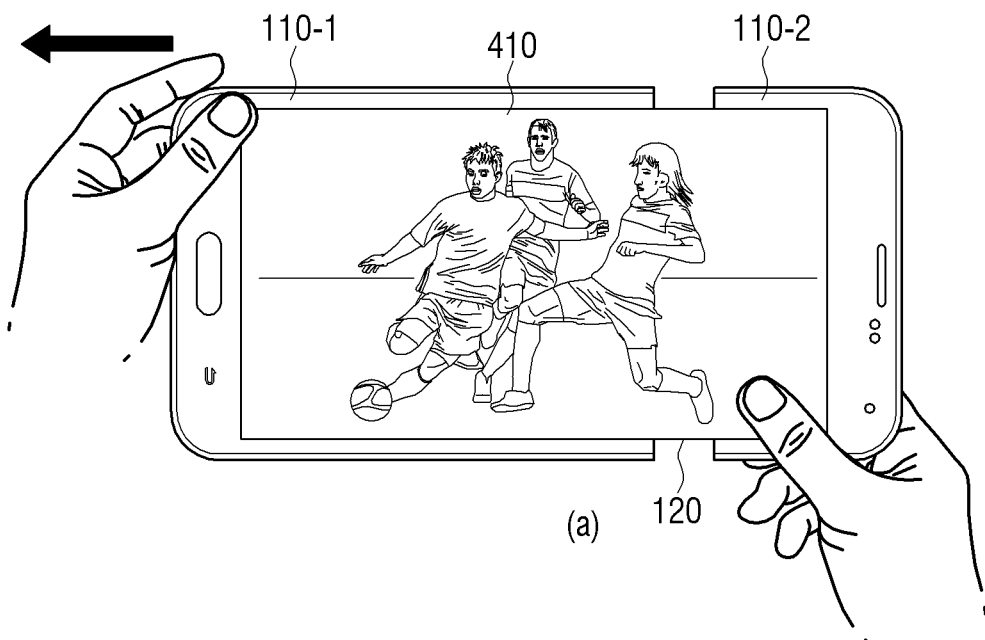
Figure 4B:
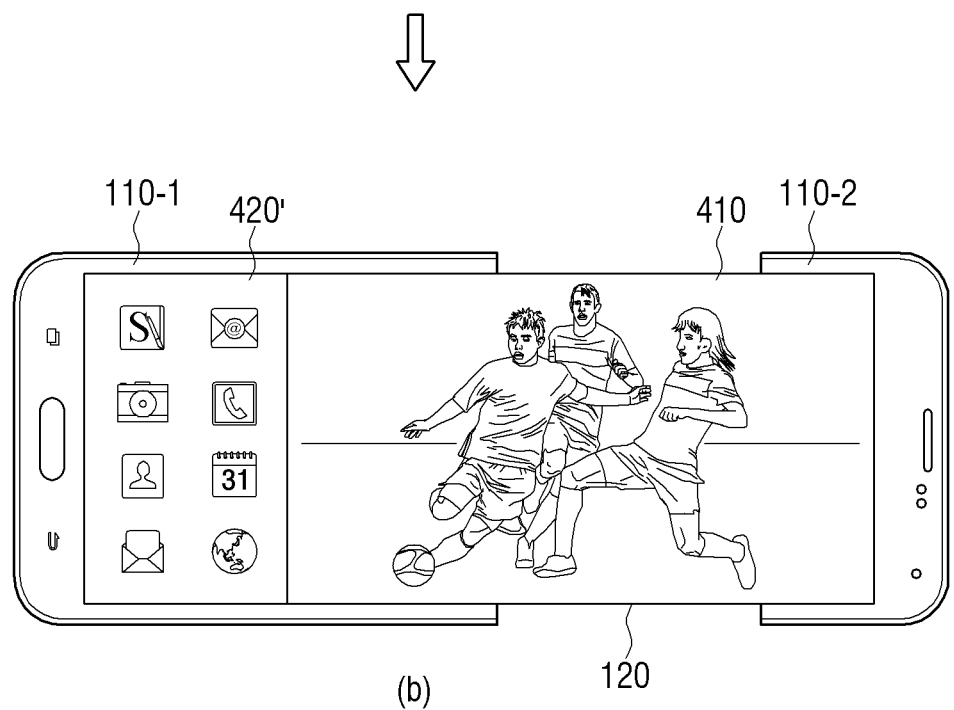
Figure 5:
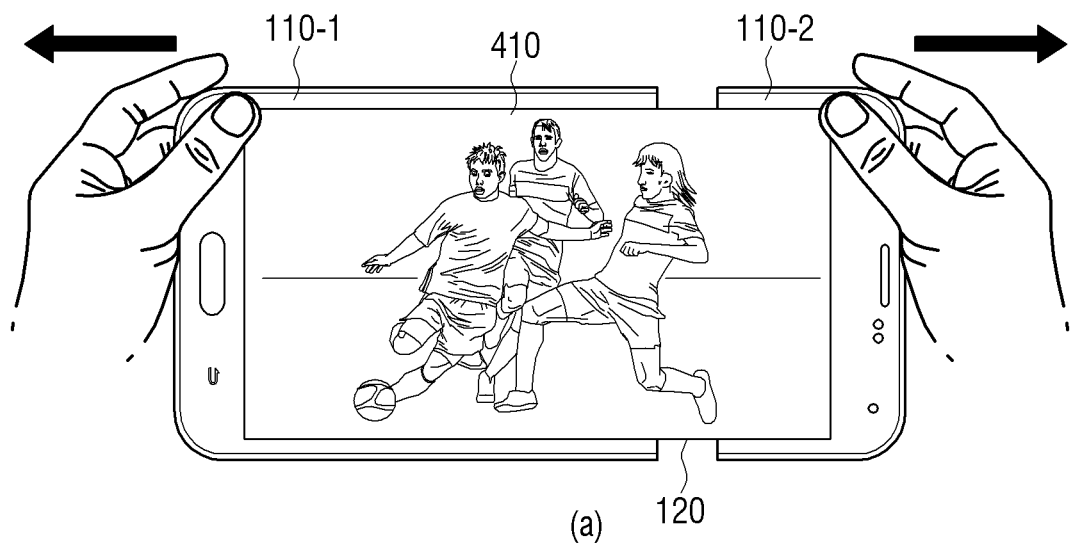
FIG. 5 is a diagram illustrating an example in which the displaying area is increased in a state in which the touch of the user is not sensed according to an exemplary embodiment of the present disclosure.
Figure 5:
Figure 5:
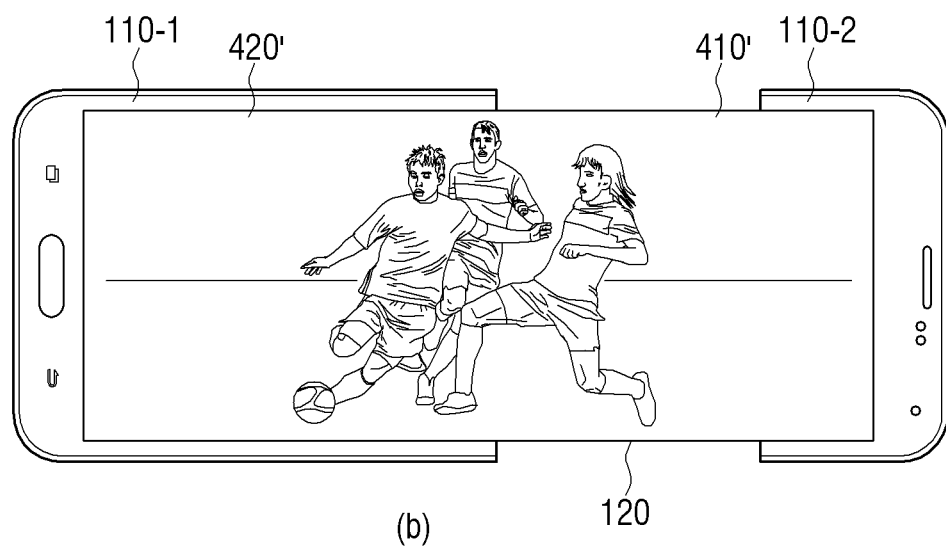

In addition, as illustrated in FIG. 4Ba, the processor 140 controls the touch display 120 to display the execution screen 410 of the video application.

In addition, the processor 140 may sense a touch and unrolling interaction in which a touch of a user touching a right area of the touch display 120 is sensed through the sensor 130 and the user expands the display area in a left direction.

If the touch and unrolling interaction is sensed, the processor 140 may control the touch display 120 to display a UI 420' including execution icons capable of executing another application on the left area of the touch display, as illustrated in FIG. 4Bb.

That is, if the display area is increased according to the rotation of the roll 115 in a state in which the user touches the right area of the touch display 120, the processor 140 may control the touch display 120 to display new information on the left area of the touch display 120.

Meanwhile, although FIGS. 4A and 4B illustrate the cases in which the same UI is displayed even in a case in which the areas on which the new information is displayed are different, this is merely one example, and different UIs may be displayed according to the area on which the new information is displayed. For example, if the display area is increased according to the rotation of the roll 115 in the state in which the user touches the right area of the touch display 120, the processor 140 may control the touch display 120 to display a first UI (e.g., a UI including the execution icon capable of executing the application) on the left area. If the display area is increased according to the rotation of the roll 115 in the state in which the user touches the left area of the touch display 120, the processor 140 may control the touch display 120 to display a second UI (e.g., a UI including an icon capable of controlling the electronic device 100) on the right area.

Meanwhile, although FIGS. 4A and 4B illustrate the cases in which the new information is displayed on the area opposite to a point at which the touch of the user is sensed, this is merely one example, and the new information may be displayed on an area corresponding to the point at which the touch of the user is sensed.

In addition, if the size of the display area is increased according to the rotation of the roll 115 in a state in which the touch of the user is not sensed in the touch display 120, the processor 140 may control the touch display 120 to increase the size of the execution screen of the application which is currently displayed without displaying the new information.

Specifically, as illustrated in FIG. 5A, the processor 140 controls the touch display 120 to display an execution screen 510 of the video application.

In addition, the processor 140 may sense an unrolling interaction in which the size of the display area is increased in both directions in a state in which the touch of the user is not sensed in the touch display 120 through the sensor 130.

If the unrolling interaction is sensed, the processor 140 may control the touch display 120 to increase a size of an execution screen 510' of the application which is currently displayed according to the increased size of the display area without displaying the new information, as illustrated in FIG. 5B.

That is, if the size of the display area is increased according to the rotation of the roll 115, the processor 140 may control the touch display 120 to provide a screen of different layouts depending on whether or not the touch of the user is sensed.

Figure 6A:
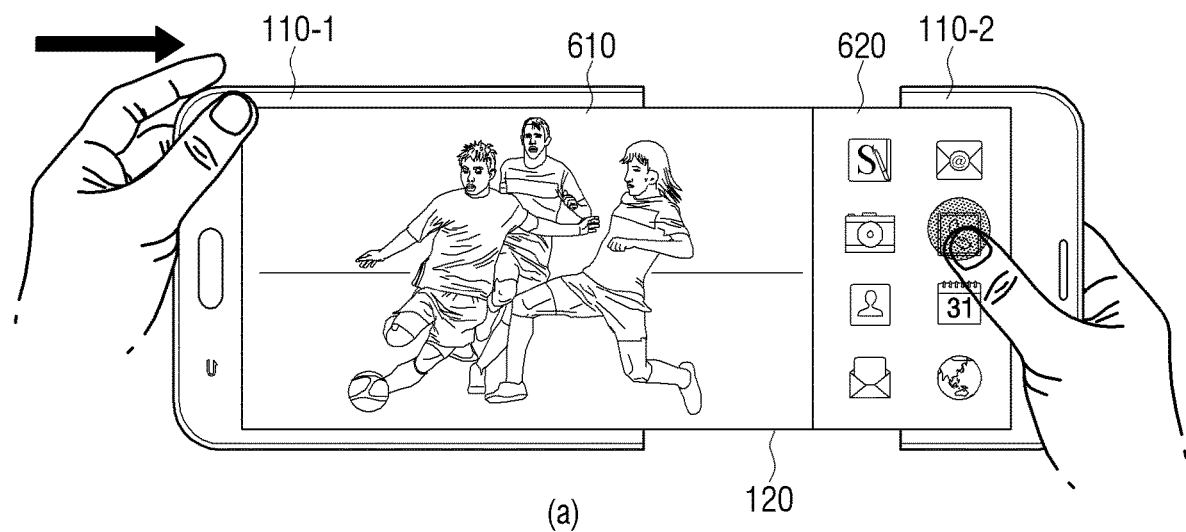
FIGS. 6A and 6B are diagrams illustrating various examples according to a position at which the touch of the user is sensed when the displaying area is reduced according to an exemplary embodiment of the present disclosure.
Figure 6A:
Figure 6A:
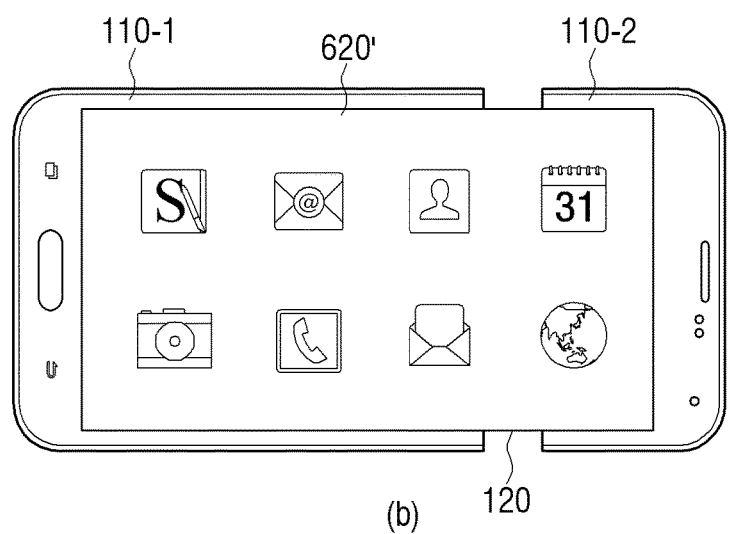
Figure 6B:
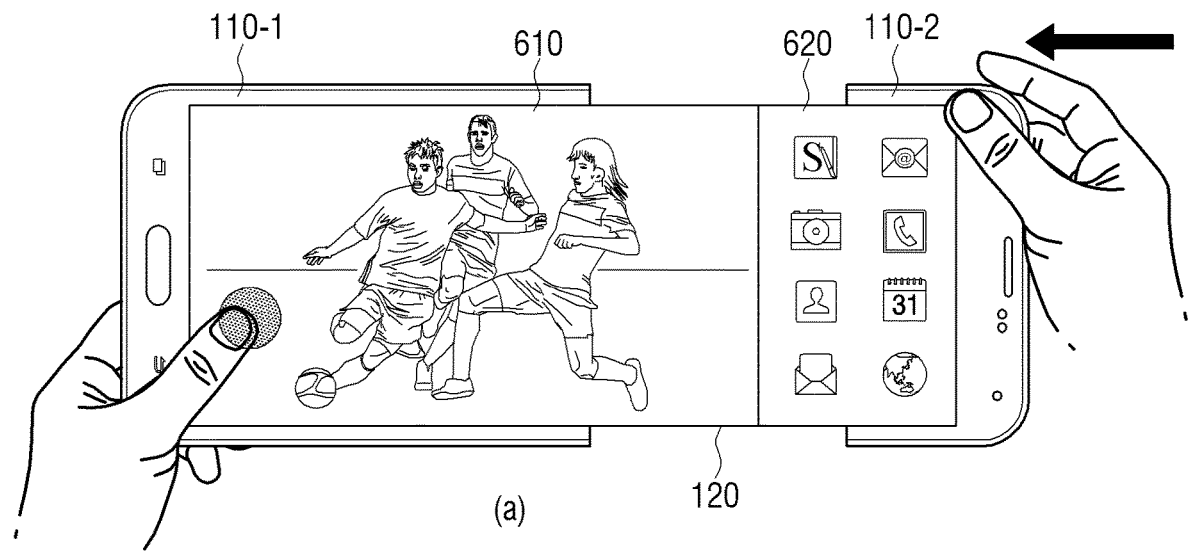
Figure 6B:
Figure 6B:
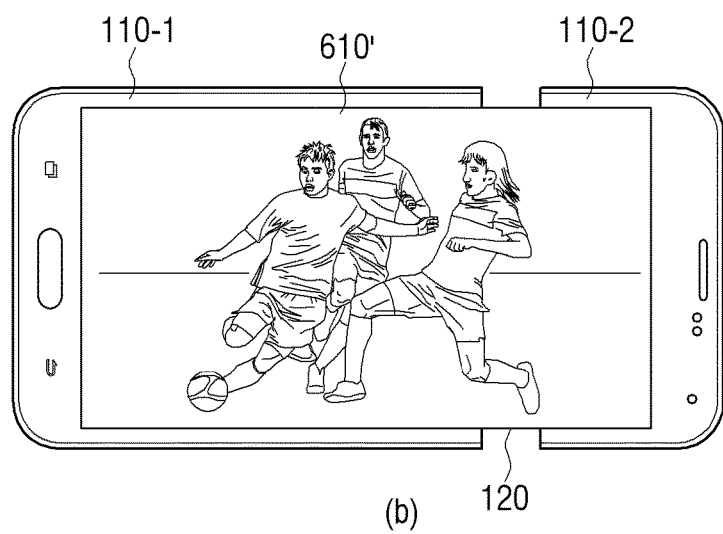
Figure 7:
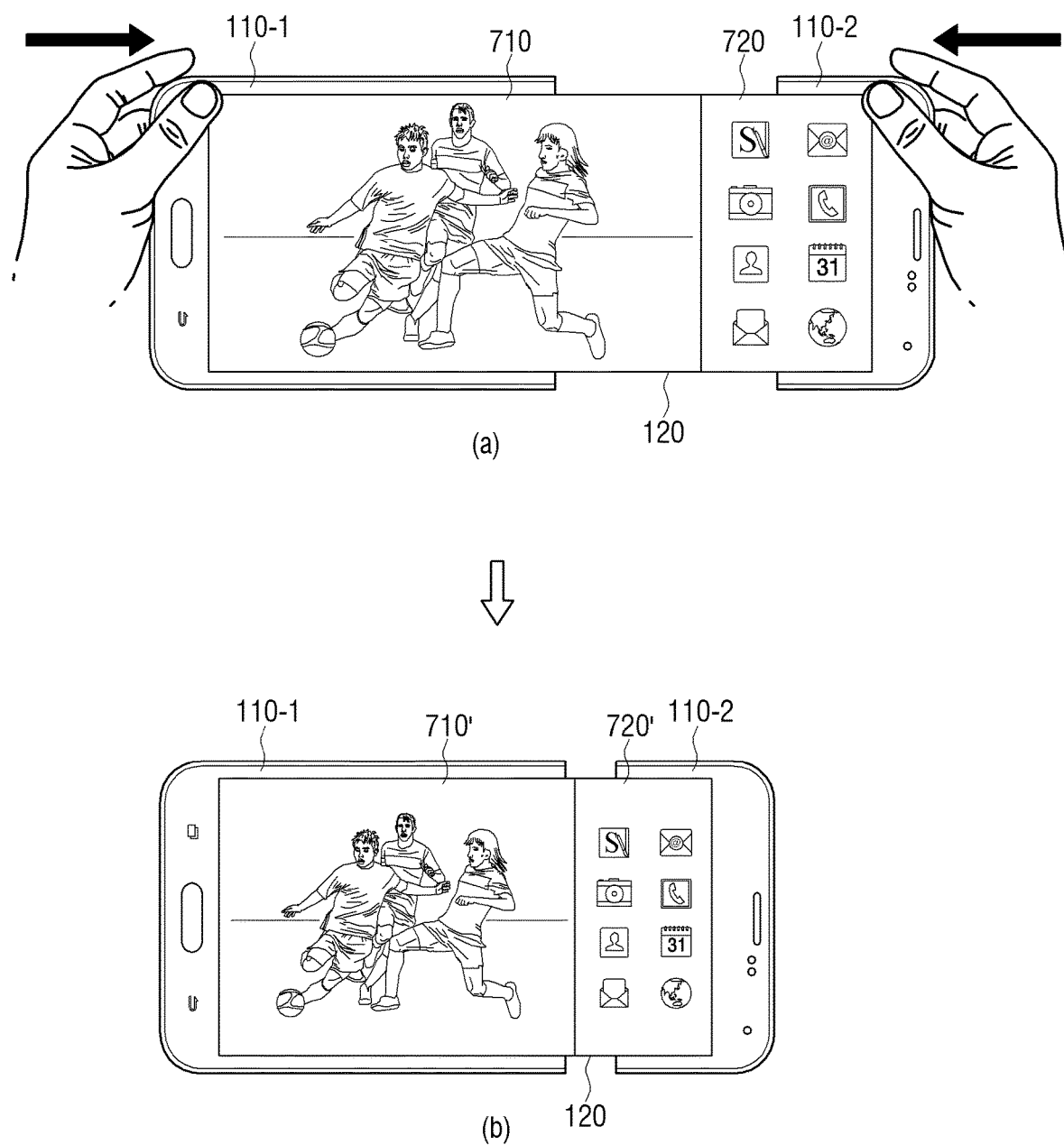
FIG. 7 is a diagram illustrating an example in which the displaying area is reduced in a state in which the touch of the user is not sensed according to an exemplary embodiment of the present disclosure.

FIGS. 6A to 7 are diagrams illustrating examples providing new information depending on whether or not a touch of a user is sensed when a size of a display area is reduced by a rolling interaction.

First, as illustrated in FIG. 6Aa, the processor 140 controls the touch display 120 to display an execution screen 610 of the video application and a UI 620 including an execution icon for executing the application.

In addition, the processor 140 may sense a touch and rolling interaction in which a touch of a user touching a right area on which the UI 620 including the execution icon is displayed is sensed through the sensor 130 and the display area is reduced.

If the touch and rolling interaction is sensed, the processor 140 may control the touch display 120 to remove the execution screen 610 of the video application and to display only a UI 620' including execution icons capable of executing another application, as illustrated in FIG. 6Ab. In this case, the UI 620' including the execution icon capable of executing another application may be changed according to the reduced size of the display area.

In addition, as illustrated in FIG. 6Ba, the processor 140 controls the touch display 120 to display an execution screen 610 of the video application and a UI 620 including an execution icon for executing the application.

In addition, the processor 140 may sense a touch and rolling interaction in which a touch of a user touching a left area on which the execution screen 610 of the video application is displayed is sensed through the sensor 130 and the display area is reduced.

If the touch and rolling interaction is sensed, the processor 140 may control the touch display 120 to remove the UI 620 including the execution icons capable of executing another application and to display only an execution screen 610' of the video application, as illustrated in FIG. 6Bb. In this case, the execution screen 610' of the video application may be changed according to the reduced size of the display area.

That is, if the touch and rolling interaction in which the size of the display area is reduced is sensed in the state in which the touch of the user is sensed while the execution screen of the application and the new information are simultaneously displayed, the processor 140 may control the touch display 120 to remove a screen displayed on an area in which the touch of the user is not sensed and to display only a screen displayed on an area in which the touch of the user is sensed.

In addition, if the size of the display area is reduced according to the rotation of the roll 115 in a state in which the touch of the user is not sensed in the touch display 120, the processor 140 may control the touch display 120 to reduce the sizes of the execution screen of the application and the new information according to the reduced size of the display area.

Specifically, as illustrated in FIG. 7A, the processor 140 controls the touch display 120 to display an execution screen 710 of the video application and a UI 720 including an execution icon for executing the application.

In addition, the processor 140 may sense a rolling interaction in which the size of the display area is reduced in at least one direction in a state in which the touch of the user is not sensed in the touch display 120 through the sensor 130.

If the rolling interaction is sensed, the processor 140 may control the touch display 120 to maintain an execution screen 710' of the video application and a position of a UI 720' including an execution icon for executing the application and to reduce only sizes thereof, as illustrated in FIG. 7B.

That is, if the size of the display area is reduced according to the rotation of the roll 115, the processor 140 may control the touch display 120 to provide a screen of different layouts depending on whether or not the touch of the user is sensed.

In addition, according to an exemplary embodiment of the present disclosure, in a case in which a drag interaction is sensed in the area on which the new information is displayed while the execution screen of the application and the new information are displayed on the display area, the processor 140 may control the touch display 120 to provide another information to the area on which the new information is displayed.

Figure 8:
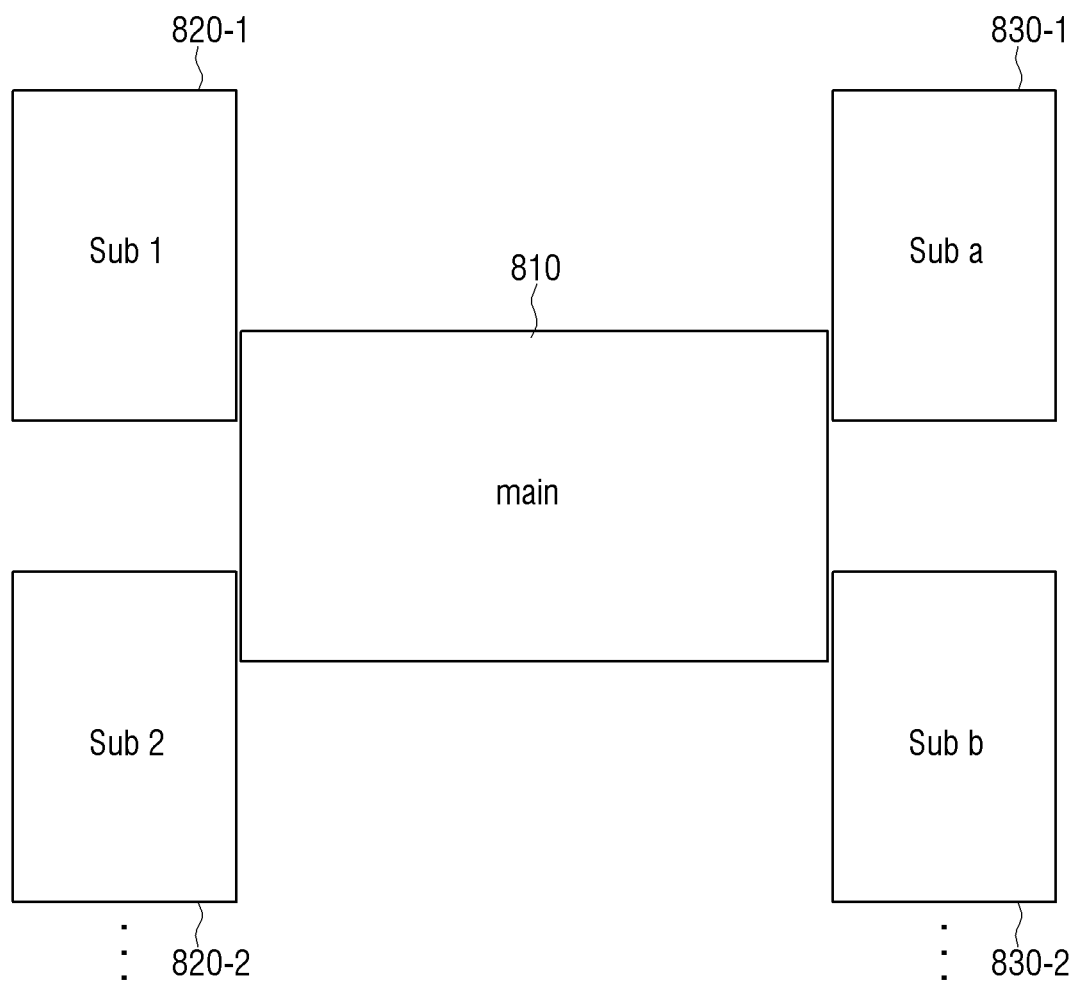
FIGS. 8 and 9 are diagrams illustrating examples in which a screen displayed on the displaying area is changed according to interaction of a user according to an exemplary embodiment of the present disclosure.
Figure 9:
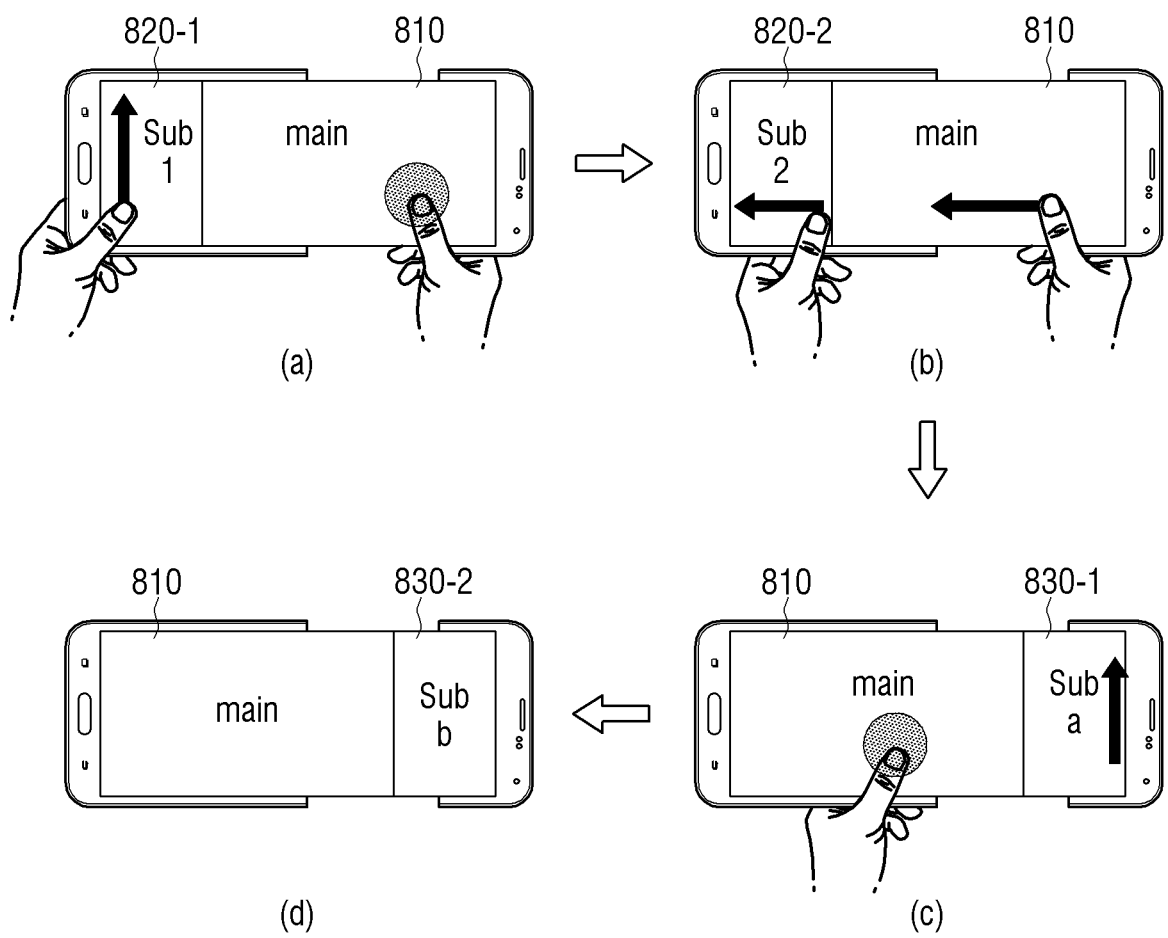

First, referring to FIG. 8, the screen displayed on the touch display 120 of the electronic device 100 may conceptually include a main area 810 and a plurality of sub areas 820-1, 820-2, 830-1, and 830-2. The main screen 810 may be an area on which various screens (e.g., an execution screen of an application, a standby screen, a lock screen, and the like) are displayed, and the sub area 820 may be an area on which the new information (e.g., a UI including an execution icon capable of executing the application, information related to the application which is currently executed, a UI capable of controlling the electronic device 100, and the like) generated by the touch and unrolling interaction is displayed.

Meanwhile, each of the sub areas 820-1, 820-2, 830-1, and 830-2 may provide different information. In addition, the sub areas 820-1, 820-2, 830-1, and 830-2 may provide different type of information depending on a position thereof. In particular, the sub area 820-1 and 820-2 positioned at the left may provide the information related to the application which is currently executed. For example, if the application which is currently executed is the video application, a first sub area 820-1 may provide information on a video which is current executed, and a second sub area 820-2 may provide information on a play list of the video application. Besides, the sub areas positioned at the left may provide the execution screen (e.g., an execution screen of a telephone application as the related application if the application which is currently executed is a text application) of the application related to the application which is currently executed.

In addition, the sub area 830-1 and 830-2 positioned at the right may provide the information which is not related to the application which is currently executed. For example, a third sub area 830-1 may provide a UI including an execution icon capable of executing another application and a fourth sub area 830-2 may provide a UI for controlling various settings (e.g., a communication setting, a volume setting, a screen setting, and the like) of the electronic device. Besides, the sub areas positioned at the right area may provide a UI providing alarm information.

In addition, the processor 140 may change the displayed sub areas through the drag interaction while the main area 810 and the sub areas are displayed.

Specifically, as illustrated in FIG. 9A, the processor 140 may control the touch display 120 to display the main area 810 and the first sub area 820-1 together. In this case, the execution screen of the application may be provided to the main area 810, and the new information generated by the touch and unrolling interaction may be provided to the sub area 820.

In addition, the processor 140 may sense a drag interaction in which the first sub area 820-1 is dragged in an upward direction in a state in which the main area 810 is touched through the touch display 120.

If the drag interaction in the upward direction is sensed, the processor 140 may control the touch display 120 to remove the first sub area 820-1 and to display the main area 810 and the second sub area 820-2 together, as illustrated in FIG. 9B. In this case, the second sub area 820-2 may be moved in the upward direction according to the drag interaction and be displayed.

In addition, the processor 140 may sense a drag interaction in which one point of each of the main area 810 and the second sub area 820-2 is touched through the touch display 120 and is then dragged in a left direction.

If the drag interaction in the left direction is sensed, the processor 140 may control the touch display 120 to remove the second sub area 820-2, to move the main area 810 in the left, and to display the third sub area 830-1 on the right area, as illustrated in FIG. 9C. In this case, the third sub area 830-1 may be moved in the left direction according to the drag interaction and be displayed.

In addition, the processor 140 may sense a drag interaction in which the third sub area 830-1 is dragged in an upward direction in a state in which the main area 810 is touched through the touch display 120.

If the drag interaction in the upward direction is sensed, the processor 140 may control the touch display 120 to remove the third sub area 830-1 and to display the main area 810 and the fourth sub area 830-2 together, as illustrated in FIG. 9D. In this case, the fourth sub area 830-2 may be moved in the upward direction according to the drag interaction and be displayed.

As described above, the processor 140 may provide a variety of information to the user by changing the sub areas through the touch interaction or the drag interaction.

Figure 10:
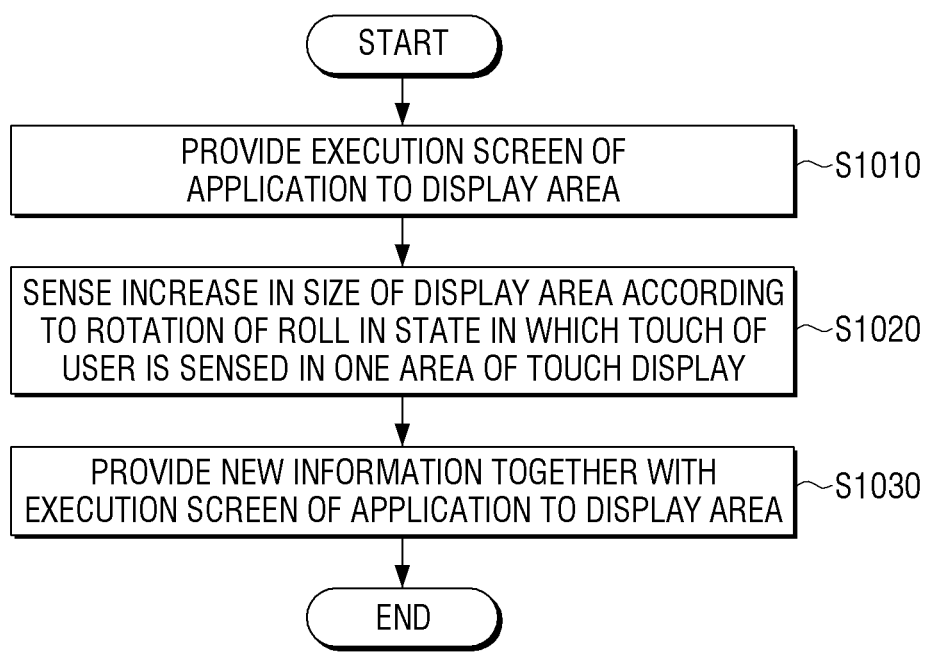
FIG. 10 is a flowchart illustrating a control method for an electronic device according to an exemplary embodiment of the present disclosure.

FIG. 10 is a flowchart illustrating a control method for an electronic device 100 according to an exemplary embodiment of the present disclosure.

First, the electronic device 100 provides an execution screen of an application to a display area (S1010). In this case, the execution screen of the application is merely one example and other screens (e.g., a standby screen, a lock screen, and the like including a plurality of application execution icons) may also be within the spirit of the present disclosure.

In addition, the electronic device 100 senses an increase in a size of a display area according to a rotation of a roll 115 in a state in which a touch of a user is sensed in one area of the touch display 120 (S1020).

In response to the increase in the size of the display area, the electronic device 100 provides new information together with the execution screen of the application to the display area (S1030).

As described above, the user may receive a variety of information while maintaining the execution screen of the application displayed on the main area, through various interactions such as the touch and unrolling interaction and the drag interaction, thereby performing a multitasking. Thereby, the electronic device 100 may improve usability of the user through a rollable display.

The device (e.g., the modules or the electronic device 100) or the method (e.g., the operations) according to the diverse exemplary embodiments may be performed, for example, by at least one computer (e.g., the processor 140) executing instructions included in at least one program of programs maintained in a computer-readable storage media.

If the instructions are executed by the computer (e.g., the processor 140), at least one computer may perform functions corresponding to the instructions. In this case, the computer-readable storage media may be, for example, the memory 150.

The program may be included in the computer-readable storage media such as, for example, a hard disk, a floppy disk, a magnetic media (e.g., a magnetic tape), an optical media (e.g., a compact disc read only memory (CD-ROM), a digital versatile disc (DVD), a magneto-optical media (e.g., a floptical disk)), a hardware device (e.g., a read only memory (ROM), a random access memory (RAM), or a flash memory), and the like. In this case, the storage media is generally included as a portion of the configuration of the electronic device 100, but may also be mounted through a port of the electronic device 100, or may also be included in an external device (e.g., a cloud, a server or another electronic device) positioned external to the electronic device 100. In addition, the program may also be divided to be stored in a plurality of storage media, and in this case, at least some of the plurality of storage media may also be positioned in the external device of the electronic device 100.

The instructions may include a high-level language code capable of being executed by a computer using an interpreter, or the like, as well as a machine language code made by a compiler. The above-mentioned hardware device may be constituted to be operated as one or more software modules to perform the operations of the diverse exemplary embodiments, and vice versa.

Hereinabove, although the exemplary embodiments of the present disclosure have been shown and described, it should be understood that the present disclosure is not limited to the disclosed embodiments and may be variously changed without departing from the spirit and the scope of the present disclosure. Therefore, the present disclosure should be construed as including all the changes, equivalents, and substitutions included in the spirit and scope of the present disclosure.

The invention claimed is:

1. An electronic device comprising:
a housing containing a roll;
a touch display configured to be rolled on the roll, and sense a touch of a user, the touch display comprising a display area having a size that changes according to a rotation of the roll;
a sensor configured to sense the size of the display area; and
a processor electrically connected to the display and the sensor,
wherein the processor is configured to control the touch display to provide new information to the display area, based on the size of the display area being increased according to the rotation of the roll in a state in which the touch of the user is sensed in one area of the touch display, that corresponds to a part of an execution screen of an application, while the execution screen of the application is provided to the display area,
the processor is further configured to control the touch display to provide the new information to an area of the display area positioned at an opposite side of the area in which the touch of the user is sensed, based on a side of the execution screen of the display area in which the touch of the user is sensed, and
the processor is further configured to control the touch display to provide the new information to the display area while maintaining a size of the execution screen of the application.

2. The electronic device as claimed in claim 1, wherein the processor is further configured to control the touch display to increase the size of the execution screen of the application provided to the display area according to the increase in the size of the display area, based on the size of the display area being increased according to the rotation of the roll in a state in which the touch of the user is not sensed in one area of the touch display while the execution screen of the application is provided to the display area.

3. The electronic device as claimed in claim 1, wherein the processor is further configured to control the touch display to provide only the execution screen of the application to the display area, based on the size of the display area being reduced according to the rotation of the roll in a state in which the touch of the user is sensed in the area to which the execution screen of the application is provided while the execution screen of the application and the new information are displayed on the display area.

4. The electronic device as claimed in claim 1, wherein the processor is further configured to control the touch display to provide only the new information to the display area, based on the size of the display area being reduced according to the rotation of the roll in a state in which the touch of the user is sensed in the area to which the new information is provided while the execution screen of the application and the new information are displayed on the display area.

5. The electronic device as claimed in claim 1, wherein the processor is further configured to control the touch display to reduce the sizes of the execution screen and the new information according to a reduction in the size of the display area, based on the size of the display area being reduced according to the rotation of the roll in a state in which the touch of the user is not sensed in the touch display while the execution screen of the application and the new information are displayed on the display area.

6. The electronic device as claimed in claim 1, wherein the processor is further configured to control the touch display to provide another information to an area on which the new information is displayed, based on a drag interaction being sensed in the area on which the new information is displayed while the execution screen of the application and the new information are displayed on the display area.

7. The electronic device as claimed in claim 1, wherein the new information is a menu.

8. A control method for an electronic device including a housing containing a roll and a touch display configured to be rolled on the roll, the touch display comprising a display area having a size that changes according to a rotation of the roll, and the touch display displaying a screen including at least one element on the display area, the control method comprising:
providing an execution screen of an application to the display area;
sensing an increase in a size of the display area according to the rotation of the roll in a state in which a touch of a user is sensed in one area of the touch display that corresponds to a part of the execution screen that is displayed; and
providing new information together with the execution screen of the application to the display area, based on the touch of the user being sensed in the one area while the size of the display area is increased,
wherein the new information is provided to an area of the display area positioned at an opposite side of the area in which the touch of the user is sensed, based on a side of the execution screen of the display area in which the touch of the user is sensed, and
in the providing of the new information, the new information is provided to the display area while a size of the execution screen of the application is maintained.

9. The control method as claimed in claim 8, further comprising:
sensing the increase in the size of the display area according to the rotation of the roll in a state in which the touch of the user is not sensed in one area of the touch display while the execution screen of the application is provided to the display area; and
increasing a size of the execution screen of the application provided to the display area according to the increase in the size of the display area, based on not sensing the touch of the user in the one area while the size of the display area is increased.

10. The control method as claimed in claim 8, further comprising:
sensing a reduction in the size of the display area according to the rotation of the roll in a state in which the touch of the user is sensed in the area to which the execution screen of the application is provided while the execution screen of the application and the new information are displayed on the display area; and
providing only the execution screen of the application to the display area, based on the touch of the user being sensed in the area while the size of the display area is reduced.

11. The control method as claimed in claim 8, further comprising:
sensing a reduction in the size of the display area according to the rotation of the roll in a state in which the touch of the user is sensed in the area to which the new information is provided while the execution screen of the application and the new information are displayed on the display area; and providing only the new information to the display area, based on the touch of the user being sensed in the area while the size of the display area is reduced.

12. The control method as claimed in claim 8, further comprising:

sensing a reduction in the size of the display area according to the rotation of the roll in a state in which the touch of the user is not sensed in the touch display while the execution screen of the application and the new information are displayed on the display area; and reducing the size of the execution screen and the new information according to the reduction in the size of the display area and providing the reduced execution screen and the new information, based on not sensing the touch of the user in the touch display while the size of the display area is reduced.

\* \* \* \* \*